US009545651B2

United States Patent
Athmer et al.

(10) Patent No.: US 9,545,651 B2
(45) Date of Patent: Jan. 17, 2017

(54) ELECTROKINETIC SOIL DESALINIZATION SYSTEM AND METHOD

(71) Applicant: Terran Corporation, Beavercreek, OH (US)

(72) Inventors: Christopher John Athmer, Oakwood, OH (US); Brent Elliot Huntsman, Xenia, OH (US)

(73) Assignee: TERRAN CORPORATION, Beavercreek, OH (US)

( * ) Notice: Subject to any disclaimer, the term of this patent is extended or adjusted under 35 U.S.C. 154(b) by 36 days.

(21) Appl. No.: 14/467,893

(22) Filed: Aug. 25, 2014

(65) Prior Publication Data

US 2016/0052030 A1 Feb. 25, 2016

(51) Int. Cl.
| | | |
|---|---|---|
| *B09C 1/00* | (2006.01) | |
| *B09C 1/08* | (2006.01) | |
| *C02F 1/00* | (2006.01) | |

(52) U.S. Cl.
CPC ............ *B09C 1/00* (2013.01); *B09C 1/085* (2013.01); *C02F 1/00* (2013.01); *B09C 2101/00* (2013.01)

(58) Field of Classification Search
CPC .............. B09C 1/00; B09C 1/002; B09C 1/02; B09C 1/062; B09C 1/085
USPC .... 405/128.15, 128.2, 128.25, 128.3, 128.45
See application file for complete search history.

(56) References Cited

U.S. PATENT DOCUMENTS

| | | | | | |
|---|---|---|---|---|---|
| 5,435,895 A | * | 7/1995 | Lindgren | ............... | B01D 57/02 204/516 |
| 5,458,747 A | * | 10/1995 | Marks | ..................... | B01D 61/42 204/515 |
| 5,846,393 A | * | 12/1998 | Clarke | .................... | B09C 1/005 204/450 |
| 5,861,090 A | * | 1/1999 | Clarke | ...................... | B09C 1/08 204/515 |
| 5,865,964 A | * | 2/1999 | Clarke | ................... | B09C 1/085 204/232 |
| 5,976,348 A | * | 11/1999 | Pugh | ....................... | B09C 1/085 204/515 |

(Continued)

OTHER PUBLICATIONS

Athmer, Christopher, et al. "Desalinization of Kaolin Soil Using Radial Electromigration and Electroosmosis", Journal of Hazardous, Toxic, and Radioactive Waste, vol. 17(1), pp. 16-20 (2013).

(Continued)

*Primary Examiner* — Benjamin Fiorello
(74) *Attorney, Agent, or Firm* — Thompson Hine LLP (57) ABSTRACT

A system for electrokinetic desalinization of soil may include at least one cathode including a hollow cathode tube perforated along its length to allow liquid water to pass through the cathode tube from an exterior thereof to an interior thereof, and a cathode conductor extending along an exterior surface of the cathode tube; at least one anode including a hollow anode tube perforated along its length to allow liquid water to pass through the anode tube from an exterior thereof to an interior thereof, and an anode conductor extending along an exterior surface of the anode tube; a make-up water line communicating with the interior of the anode tube; an anode discharge line communicating with the interior of the anode tube; and a cathode discharge line communicating with the interior of the cathode tube.

26 Claims, 4 Drawing Sheets

(56) References Cited

U.S. PATENT DOCUMENTS

| | | | | |
|---|---|---|---|---|
| 6,210,078 | B1* | 4/2001 | Redwine | B01D 61/16 |
| | | | | 134/28 |
| 7,290,959 | B2* | 11/2007 | Beyke | B09C 1/00 |
| | | | | 405/128.55 |
| 2008/0132746 | A1* | 6/2008 | Frisky | B09C 1/002 |
| | | | | 588/303 |
| 2012/0325663 | A1* | 12/2012 | Kim | E02D 31/002 |
| | | | | 204/515 |
| 2013/0094907 | A1* | 4/2013 | Sugano | B09C 1/00 |
| | | | | 405/128.7 |

OTHER PUBLICATIONS

Athmer, Christopher, et al. "Desalinization of Field Soil Using Radial Electromigration and Electroosmosis", Journal of Hazardous, Toxic, and Radioactive Waste, vol. 18(1), pp. 83-86 (2014).

Alshawabkeh, et al. "Optimization of 2-D electrode configuration for electrokinetic remediation," J. Soil Contam., 8(6), pp. 617-635. (1999).

Athmer, C. J. "Cost estimates for electrokinetic remediations," Electrochemical remediation technologies for polluted soils, sediments and groundwater, K. R. Reddy and C. Cameselle, eds., Wiley, Hoboken, NJ, pp. 8-9 (2009).

Cho, et al. "Electrokinetic restoration of saline agricultural lands," J. Appl. Electrochem., 40(6), pp. 1085-1093. (2010).

Haroun, et al. "The efficacy of using electrokinetic transport in highly contaminated offshore sediments," J. Appl. Electrochem., 40(6), pp. 1131-1138 (2010).

Ho, et al. "The Lasagna technology for in situ soil remediation. 2, Large field test," Environ. Sci. Tech., 33(7), pp. 1092-1099 (1999).

Kelly, et al. "Remediation of salt impacted groundwater with electrokinetics," 2005 Annual Conf. of the Transportation Association of Canada, Calgary, Alberta, Canada. (2005).

Kim, et al. "Electrokinetic removal of chloride and sodium from tidelands," J. Appl. Electrochem., 40(6), pp. 1139-1144 (2010).

Koneshan, et al. "Solvent structure, dynamics, and ion mobility in aqueous solutions at 25° C.," J. Phys. Chem. B, 102(21), pp. 4193-4204 (1998).

Alshawabkeh, et al. "Practical Aspects of In-Situ Electrokinetic Extraction", Journal of Environmental Engineering, vol. 125, pp. 27-35 (1999).

Wittle, et al. "The Use of Electrokinetics for the Removal of Salt from Brine Impacted Soils", 13th Annual International Petroleum Environmental Conference, San Antonio, Texas. (2006).

Product Information featuring DNOx Oxygen & Specialities, Cathodic Protection, LIDA® Wire Anodes by De Nora (Oct. 2007).

Website featuring "Loresco Flexfill Free Flowing Earth Contact Backfill," by Farwest Corrosion Control Company, http://www.farwestcorrosion.com/loresco-flexfill-free-flowing-earth-contact-backfill.html (retrieved from the internet on Apr. 8, 2014).

Kim, Do-Hyung, et al. "Hexagonal two dimensional electrokinetics systems for restoration of saline agricultural lands: A pilot study," Chemical Engineering Journal, vol. 198-199, pp. 110-121 (2012).

Website featuring "Envirocoke IV™ Conductive Carbon Grout," by Loresco http://www.loresco.com/envirocoke.html (retrieved from the internet on Jun. 4, 2014).

* cited by examiner

ELECTROKINETIC SOIL DESALINIZATION SYSTEM AND METHOD

TECHNICAL FIELD

The disclosure relates to systems and methods for desalinization, and more particularly, to systems and methods for desalinization of contaminated soil and pore water utilizing electrokinetics.

BACKGROUND

Soil contaminated by salt poses a significant problem for many facilities. For example, the soil in the vicinity of oil fields and oil pipelines may become so contaminated with salt that the soil is unfit for plant growth. In such situations, groundwater located beneath the surface of the soil and soil pore spaces may become contaminated with salt, and with liquid water containing high concentrations of salt. Therefore, it is necessary to remediate soil containing high concentrations of salt, either as a precipitate or from pore water containing high concentrations of salt.

One method of soil remediation involves removing soil containing high concentrations of salt and burying the contaminated soil in a pit lined with a water-impermeable liner, such as clay. However, such methods are costly, and require large areas for the pit. This method simply relocates the problem and does not fully address the salt-contaminated soil.

Other methods of soil remediation involve the use of electrokinetics. With electrokinetic soil remediation, the soil remains intact and anode and cathode tubes are sunk in patterns in the contaminated soil. An electric current is supplied to the anode and cathode tubes and, through the principles of electroosmosis and electromigration, the dis-associated sodium and chloride ions migrate through the pore water in the contaminated soil to collect around the cathode and anode, respectively, where they are extracted. However, most electrokinetic processes are slow and complex.

Accordingly, there is a need for an electrokinetic system and method that is efficient and robust.

SUMMARY

In an embodiment, a system for electrokinetic desalinization of soil may include at least one cathode having a hollow cathode tube perforated along its length to allow liquid water to pass through the cathode tube from an exterior thereof to an interior thereof, and a cathode conductor extending along an exterior surface of the cathode tube; at least one anode including a hollow anode tube perforated along its length to allow liquid water to pass through the anode tube from an exterior thereof to an interior thereof, and an anode conductor extending along an exterior surface of the anode tube; a make-up water line communicating with the interior of the anode tube; an anode discharge line communicating with the interior of the anode tube; and a cathode discharge line communicating with the interior of the cathode tube.

In another embodiment, a method for desalinization of soil may include sinking at least one cathode into the soil, the at least one cathode including a hollow cathode tube perforated along its length to allow liquid water to pass through the cathode tube from an exterior thereof to an interior thereof, and a cathode conductor extending along an exterior surface of the cathode tube; sinking at least one anode into the soil, the at least one anode including a hollow anode tube perforated along its length to allow liquid water to pass through the anode tube from an exterior surface thereof to an interior thereof, and an anode conductor extending along an exterior surface of the anode tube; providing direct current electricity having a negative plurality connected to the cathode conductor and a positive plurality connected to the anode conductor, the electricity having sufficient power to attract sodium ions in the soil to the at least one cathode and chloride ions in the soil to at least one anode, whereby water in the interior of the cathode tube becomes rich in the sodium ions, and water in the interior of the anode tube becomes rich in the chloride ions; and conveying the water rich in chloride ions from an interior of the anode tube through an anode discharge line communicating with the interior of the anode tube, and conveying the water rich in sodium ions from an interior of the cathode tube through a cathode discharge line communicating with the interior of the cathode tube.

In yet another embodiment, a system for electrokinetic desalinization of soil may include at least one cathode having a hollow cathode tube perforated along its length to allow liquid water to pass through the cathode tube from an exterior thereof to an interior thereof, and a cathode conductor extending along an exterior surface of the cathode tube; at least one anode having a hollow anode tube perforated along its length to allow liquid water to pass through the anode tube from an exterior thereof to an interior thereof, and an anode conductor extending along an exterior surface of the anode tube; a make-up water line communicating with the interior of the anode tube and/or the interior of the cathode tube to supply make-up water to the anode tube and/or the cathode tube; an anode discharge line communicating with the interior of the anode tube; and a cathode discharge line communicating with the interior of the cathode tube.

Other objects and advantages of the disclosed electrokinetic soil desalinization system and method will be apparent from the following description, the accompanying drawings, and the appended claims.

DETAILED DESCRIPTION

Figure 1:
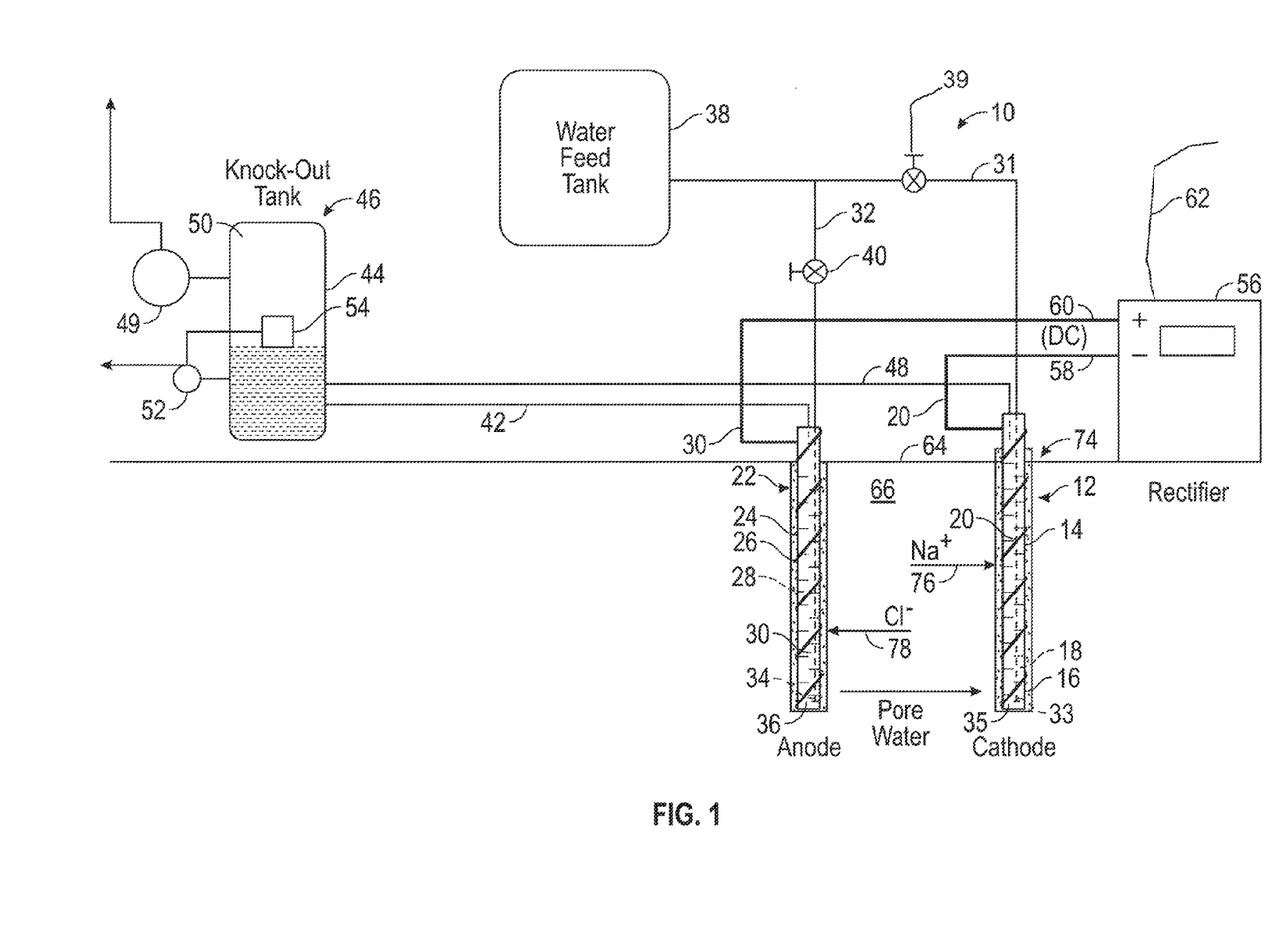
FIG. 1 is a schematic diagram of the disclosed electrokinetic soil desalinization system.

As shown in FIG. 1, a system for electrokinetic desalinization of soil, generally designated 10, may include at least one cathode, generally designated 12, that may have a hollow cathode tube 14 perforated along its length to allow liquid pore water to pass through the cathode tube from an exterior surface 16 thereof to an interior 18 thereof, and a cathode conductor 20 extending along the exterior surface of the cathode tube. The system 10 also may include at least one anode, generally designated 22, that may have a hollow anode tube 24 perforated along its length to allow liquid pore water to pass through the anode tube from an exterior surface 26 thereof to an interior 28 thereof, and an anode conductor 30 extending along the exterior surface of the anode tube.

Feed water lines 31, 32 may communicate with the interiors 18, 28 of the cathode tube 14 and anode tube 24, respectively. Feed water or make-up water lines 31, 32 may extend substantially the entire lengths of the cathode tube 14 and anode tube 24, respectively, and open at lower ends 33, 34 thereof in lower portions 35, 36 of the cathode tube 14 and anode tube 24, respectively. The feed water lines 31, 32 may be connected to a source 38 of water, which in an embodiment may take the form of a fresh water feed tank. In embodiments, feed water lines 31, 32 may be connected to separate water feed tanks that may make up the source 38 of water, or to a source or sources of water under pressure, such as by a pump or pumps from a well or wells. Flow of feed water through the feed water lines 31, 32 from the water feed tank 38 may be regulated by a valves 39, 40, respectively, on the feed water lines.

The system 10 may include an anode discharge line or siphon tube 42 that communicates with the interior 28 of the anode tube and is connected at an opposite end to a knock-out tank 44 that may be part of a vacuum extraction component, generally designated 46. Similarly, the system 10 may include a cathode discharge line or siphon tube 48 that communicates with the interior 18 of the cathode tube 14 and may be connected to the knock-out tank 44 of the vacuum extraction component 46. In an alternate embodiment of vacuum extraction component 46, knock-out tank 44 may take the form of separate and discrete tanks, with one associated with the cathode discharge line 48 and the other associated with the anode discharge line 42.

The vacuum extraction component 46 also may include a vacuum blower 49 for creating a negative pressure in the interior 50 of the knock-out tank 44 in order to draw pore water through the anode discharge line 42 and cathode discharge line 48 into the tank. The vacuum extraction component 46 also may include a brine discharge pump 52 that may include a float switch 54 within the interior 50 of the knock-out tank 44. The brine discharge pump 52 may be activated by the float switch 54 when the level of pore water from the anode discharge line 42 and cathode discharge line 48 within the tank 44 reaches a predetermined level. Another embodiment of vacuum extraction component 46 may take the form of two discrete systems, each having a knock-out tank 44, vacuum blower 49, and brine discharge pump 52 actuated by float switch 54.

The system 10 also may include a source 56 of direct current electricity having a negative terminal 58 connected to the cathode conductor 20 and a positive terminal 60 connected to the anode conductor 30. In an embodiment, the source 56 may be a rectifier that receives power over a line 62 from a source (not shown) of electricity, such as a power generator. In alternate embodiments, the source may be a series of solar panels, wind turbines, or other direct current supply sources.

Figure 2:
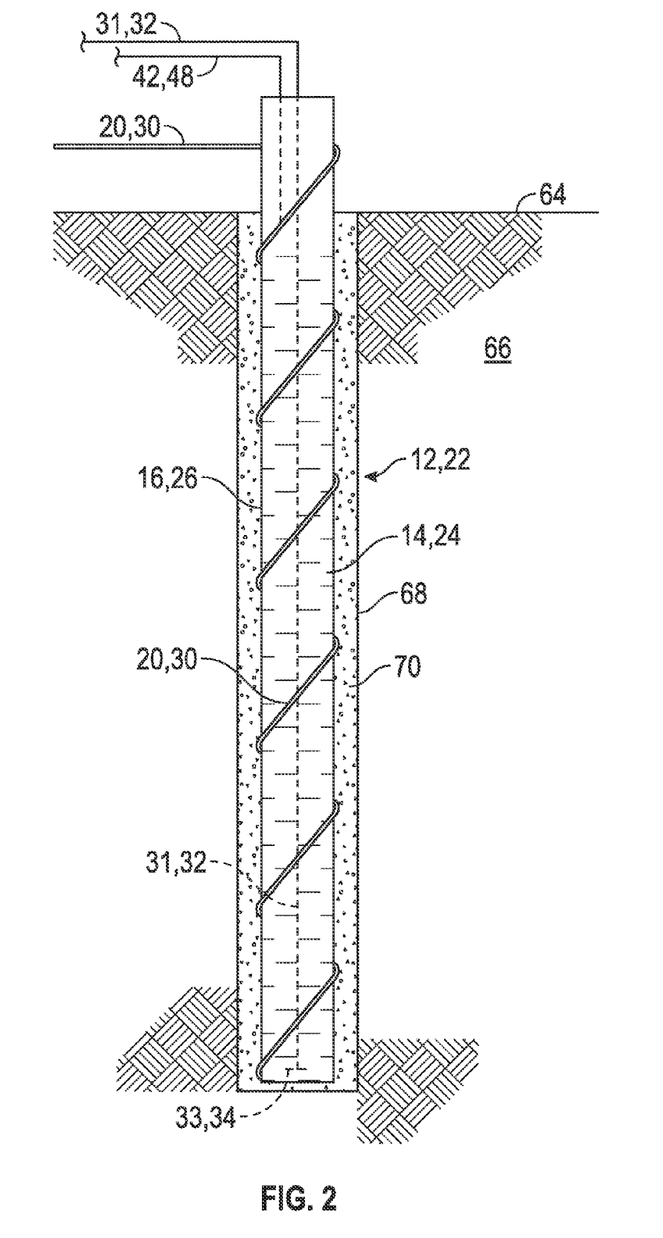
FIG. 2 is a detail showing a representative one of the cathode and anode of the system shown in FIG. 1.

As shown in FIG. 2, the cathode 12 and anode 22 each may include a cathode tube 14, and an anode tube 24, respectively. The cathode tube 14 and/or the anode tube 24 may comprise a tube or pipe made of a corrosion-resistant material. In embodiments, the corrosion-resistant material may be selected from nylon, hard rubber, and plastic. In a specific embodiment, the cathode tube 14 and anode tube 24 each may be made of polyvinyl chloride (PVC). In other embodiments, the anode tube 24 may be made of PVC or other corrosion-resistant material and the cathode tube 14 may be made of a conductive material such as cast iron, ductile iron, or stainless steel.

In embodiments, the cathode tube and anode tube 14, 24 each may be one-inch diameter PVC pipe, such as bore-hole screen, having openings therethrough to the interiors 18, 28. In embodiments, the openings may be slots approximately 0.010 inches wide, or a series of holes approximately 0.010 inches in diameter. The cathode tube 14 and anode tube 24 each may be approximately five feet long, or longer. In embodiments, the cathode tube 14 and anode tube 24 may be sunk below the surface 64 of the soil 66 that is contaminated within a bore-hole 68 so that the cathode tube and anode tube are oriented substantially vertically and are substantially parallel to each other (see FIG. 1). Each bore-hole 68 may be approximately two to four inches in diameter and may be made by direct push or by an auger. In embodiments, each bore-hole 68 may be backfilled with a granular, electrically conductive material 70.

The granular, electrically conductive material 70 may extend throughout the bore-hole 68 and therefore surround the outer surfaces 16, 26 of the cathode and anode tube 12, 14, respectively. The granular, electrically conductive material 70 may extend substantially along the entire lengths of each cathode tube 14 and/or the anode tube 24. The granular, electrically conductive material 70 may be sized and packed within the bore-holes 68 sufficiently to support the cathode and anode tubes 12, 22 within the bore-holes in a substantially vertical position, but with enough space to allow liquid pore water to pass therethrough from the contaminated soil 66 to the cathode tube 14 and/or the anode tube 24.

In an embodiment, the granular, electrically conductive material 70 may be selected from a conductive carbon and a partially graphitized coke. In a more specific embodiment, the granular, electrically conductive material 70 may be coke breeze. An example of such a material is Loresco RS-3 Premium Earth Contact Backfill, available from Loresco International, Hattiesburg, Miss.

Also as shown best in FIG. 2, the cathode conductor 20 may take the form of a conductive wire wrapped around and supported on the exterior surface 16 of the cathode tube 14 along its length, and in a particular embodiment, the conductive wire may be spiral wrapped about the exterior surface of the cathode tube. Similarly, in an embodiment, the anode conductor 30 may be a conductive wire wrapped around the exterior surface 26 of the anode tube 24 along its length, and in a particular embodiment, the wire may be spiral wrapped around the exterior surface of the anode tube along its length. In an embodiment, the conductive wire that may comprise the conductors 20, 30 of the cathode 12 and anode 22 may include three millimeter diameter LIDA brand anode wire, manufactured by Industrie De Nora of Milan, Italy. Other wire or conductors may be used that may comprise a mixed metal oxide coating. The mixed metal oxide enables the wire or conductor to function as an anode.

Figure 3:
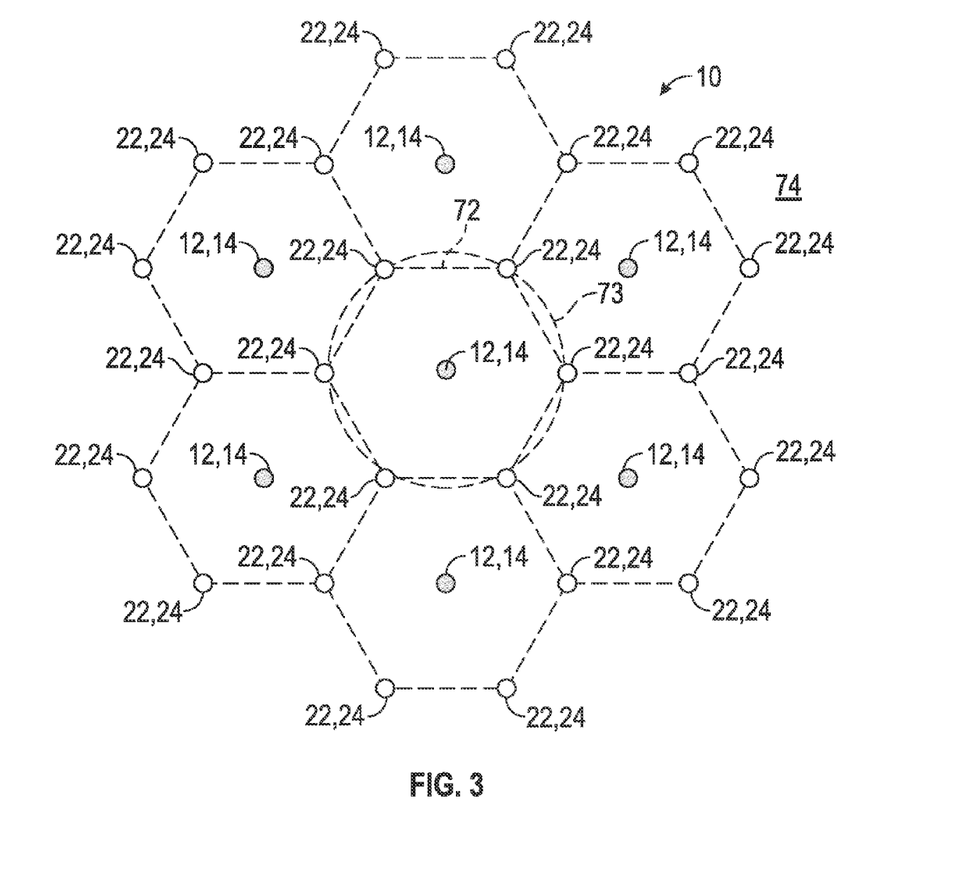
FIG. 3 is a schematic diagram of an embodiment of the disclosed electrokinetic soil desalinization system in which the cathodes and anodes are arranged in a repeating hexagonal pattern.

As shown in FIG. 3, in an embodiment, the system 10 may include a plurality of cathodes 12 and anodes 22. Each cathode 12 may include a cathode tube 14 (see FIG. 1), and each anode 22 may include an anode tube 24. The plurality of cathodes 12 and the plurality of anodes 22 may be arranged in a pattern wherein at least one cathode of the plurality of cathodes may be surrounded by a plurality of anodes. In a particular embodiment, the plurality of anodes 22 may be spaced evenly about at least one cathode 12, and preferably each of the cathodes. In the embodiment shown, each of the anodes 22 may be spaced evenly about a cathode 12, and in a particular embodiment, the spacing of the anode tubes 24 forms a hexagonal grid pattern 72 around each of the cathode tubes 14, in which the grid pattern approximates a cylinder 73 in which a ring of anodes 12 surrounds a center cathode 12. Accordingly, a contaminated soil field, generally designated 74, may be treated by the system 10 by arranging the anodes 22 and cathodes 12 in a repeating hexagon grid pattern 72.

Figure 4:
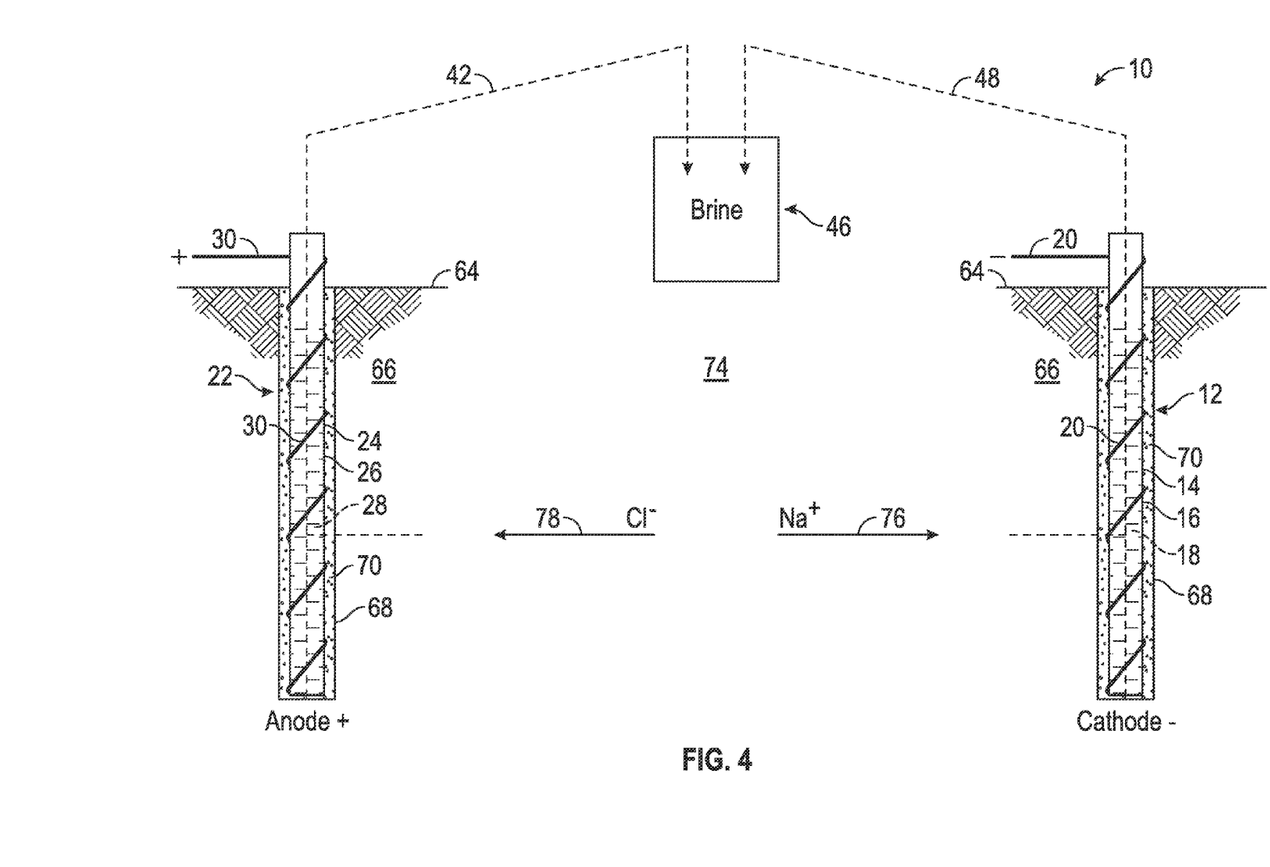
FIG. 4 is a schematic diagram of the system of FIG. 1, showing the electroosmotic migration of ions in contaminated soil.

The method of operation of the system 10 is shown schematically in FIG. 4, with reference to FIG. 1. The method for desalinization of soil 66 in a contaminated soil field 74 may include sinking at least one cathode 12 into the soil, the at least one cathode including a hollow cathode tube 14 perforated along its length to allow liquid pore water to pass through the cathode tube from an exterior 16 thereof to an interior 18 thereof, and a cathode conductor 20 extending along the exterior surface of the cathode tube. The cathode tube 14 may be sunk directly below the surface 64 into the contaminated soil 66 of the field 74. In other embodiments, a bore-hole 68 may be first sunk substantially vertically in the soil 66 to receive the tube 14. In embodiments, the bore-hole 68 may be oversized and the tube 14 may be fixed in the bore-hole 68 by backfilling with a conductive, granular, electrically conductive material 70.

An anode 22 may be sunk into the soil 66 and may include a hollow anode tube 24 perforated along its length to allow liquid pore water to pass through the anode tube 24 from an exterior surface 26 to an interior 28 thereof, and an anode conductor 30 extending along the exterior surface of the anode tube. The anode tube 24 may be sunk directly below the surface 64 into the contaminated soil 66 of the field 74. In other embodiments, a bore-hole 68 may be first sunk substantially vertically in the soil 66 to receive the tube 24. In embodiments, the bore-hole 68 may be oversized and the tube 24 may be fixed in the bore-hole 68 by backfilling with a conductive, granular, electrically conductive material 70.

Salt contained in the contaminated soil 66 may dissociate into sodium ions and chloride ions when dissolved in pore water. The pore water may be present in the contaminated soil, or may be added to the field 74. Direct current electricity having a negative polarity is connected to the cathode conductor 20, and direct current electricity having a positive polarity is connected to the anode conductor 30. The direct current electricity may be supplied by the rectifier 56, or other direct current source. The current at the cathode 12 and anode 22 creates an electric field within the contaminated soil 66 that causes electro-migration of the sodium ions 76 in the pore water contained in the contaminated soil 66 toward the negatively charged cathode conductor 20 and collect in the water within the interior 18 of the cathode tube 14. There, water with a relatively high concentration of sodium atoms may be siphoned to the knock-out tank 44 through siphon tube 48. In an embodiment, the siphon tube 48 may be connected to the interior 18 of the cathode tube 14 to draw water from the top or upper portion of the cathode tube 12, and in a particular embodiment, from above the perforations in the cathode tube 14. Fresh make-up water from feed water tank 38 may be supplied through line 31 to the lower portion 35 of the cathode tube 14 to replace water containing a high concentration of sodium ions siphoned from the upper portion of the cathode tube, in the event the electroosmosis flow is insufficient.

Similarly, the electrical field set up between the cathode 12 and anode 22 causes electro-migration of the chloride ions 78 dissolved from the salt in the contaminated soil 66 and present in the pore water within the field 74 toward the positively charged anode conductor 30 to collect in the water contained in the interior 28 of the anode tube 24. The anode line 42 or siphon tube draws pore water containing a high concentration of chloride ions from within the interior 28 of the anode tube 24 and conveys it to the knock-out tank 44. In an embodiment, the anode line 42 draws pore water from an upper portion of the anode tube 24, and in a particular embodiment, from a location above the perforations in the tube. Fresh make-up water from feed water tank 38 may be supplied through line 32 to the lower portion 36 of the anode tube 24 to replace water containing a high concentration of chloride ions siphoned from the upper portion of the anode tube.

The mixture of pore water from the cathode 12 containing a high concentration of sodium ions and the pore water from anode 22 containing a high concentration of chloride ions mix in the knock-out tank 44 to reform brine. The brine is retained within the interior 50 of the knock-out tank and may be discharged by brine discharge pump 52 if the level within the tank exceeds a predetermined level. To facilitate this process, feed water from feed water tank 38 may be conveyed through feed water line 32 to the bottom or lower portion 36 of the anode tube 24.

Rate of migration of the sodium ions 76 and chloride ions 78 may be proportional to the voltage gradient between the cathode 12 and the anode 22, ionic mobility, and convectional flow (hydraulic plus electroosmotic) of ions through the contaminated soil 66 in the field 74.

The system 10 and method thus provide an efficient and economical means for remediating soil that may be contaminated with salt, and may be used to remediate soil that has been contaminated with other contaminants that disassociate into positive and negative ions when dissolved in water. The system 10 and method obviate the need for remediating contaminated soil by removing the soil and placing it in a pit or other landfill, thereby saving money. As an added step, the rectifier 56 (FIG. 1) may reverse polarity to balance the pH gradient within the soil 66 at the end of the process described with reference to FIG. 4.

While the methods and forms of apparatus herein described constitute preferred embodiments of the disclosed electrokinetic soil desalinization system and method, it is to be understood that variations may be made to these methods and systems without departing from the scope of the invention.

What is claimed is:

1. A system for electrokinetic desalinization of soil, the system comprising:
    a first bore-hole formed below the surface of the soil;
    a second bore-hole formed below the surface of the soil;
    a cathode including a hollow cathode tube perforated along its length to allow liquid water to pass through the cathode tube from an exterior thereof to an interior thereof, the cathode tube located within the first bore-hole, and a cathode conductor wrapped around and supported on an exterior surface of the cathode tube along an entire length of the cathode conductor within the first bore hole;
    an anode including a hollow anode tube perforated along its length to allow liquid water to pass through the anode tube from an exterior thereof to an interior thereof, the anode tube located within the second bore-hole, and an anode conductor wrapped around and supported on an exterior surface of the anode tube along an entire length of the anode conductor within the second bore hole;
    the first bore-hole and the second bore hole each including granular, electrically conductive material, the granular, electrically conductive material backfilling the first bore-hole and surrounding the exterior surface of the cathode tube, and backfilling the second bore-hole and surrounding the exterior surface of the anode tube;
a make-up water line communicating with the interior of the anode tube;
a first discharge line communicating with the interior of the anode tube; and
a second discharge line communicating with the interior of the cathode tube.

2. The system of claim 1, wherein the cathode tube and the anode tube are each oriented substantially vertically.

3. The system of claim 1, further comprising a source of direct current electricity having a negative terminal connected to the cathode conductor and a positive terminal connected to the anode conductor.

4. The system of claim 1, further comprising a source of water connected to the make-up water line.

5. The system of claim 4, wherein the make-up water line communicates with the anode tube to insert the water from the source of water into a lower portion of the anode tube.

6. The system of claim 5, wherein the make-up water line extends along the interior of the anode tube and is open at the lower portion of the anode tube.

7. The system of claim 1, further comprising a vacuum siphon component connected to the anode discharge line and to the cathode discharge line.

8. The system of claim 7, wherein the vacuum siphon component includes a knock-out tank, connected to the cathode discharge line and to the anode discharge line, for collecting water from the interior of the cathode tube and the interior of the anode tube.

9. The system of claim 8, wherein the vacuum siphon component includes a vacuum blower connected to the knock-out tank to maintain a pressure within the knock-out tank below atmospheric pressure.

10. The system of claim 9, wherein the vacuum siphon component includes a brine discharge pump connected to the knock-out tank for pumping brine from the interior of the knock-out tank above a predetermined volume.

11. The system of claim 1, wherein the granular, electrically conductive material is material sized and packed to allow liquid water to pass therethrough.

12. The system of claim 11, wherein the granular, electrically conductive material is selected from a conductive carbon and a partially graphitized coke.

13. The system of claim 11, wherein the granular, electrically conductive material is coke breeze.

14. The system of claim 1, wherein the cathode tube is made of a material selected from polyvinyl chloride, cast iron, and stainless steel.

15. The system of claim 1, wherein the anode tube is made of a corrosion-resistant material.

16. The system of claim 15, wherein the anode tube is made of polyvinyl chloride.

17. The system of claim 1, wherein the cathode conductor is a conductive wire wrapped around the exterior surface of the cathode tube along its length.

18. The system of claim 17, wherein the conductive wire is spiral wrapped about the exterior surface of the cathode tube.

19. The system of claim 1, wherein the anode conductor is a conductive wire wrapped around the exterior surface of the anode tube along its length.

20. The system of claim 19, wherein the conductive wire is spiral wrapped around the exterior surface of the anode tube along its length.

21. The system of claim 1, wherein the cathode includes a plurality of cathode tubes and the anode includes a plurality of anode tubes; the plurality of cathode tube and plurality of anode tubes arranged in a pattern wherein at least one cathode tube of the plurality of cathode tubes is surrounded by the plurality of anode tubes.

22. The system of claim 21, wherein the plurality of anode tubes is spaced evenly about the at least one cathode tube of the plurality of cathode tubes.

23. The system of claim 22, wherein the plurality of anode tubes is spaced about the at least one cathode tube of the plurality of cathode tubes in a hexagon grid pattern.

24. A method for desalinization of soil, the method comprising:
forming a first bore-hole formed below the surface of the soil;
forming a second bore-hole formed below the surface of the soil;
placing a cathode into the first bore-hole, the cathode including a hollow cathode tube perforated along its length to allow liquid water to pass through the cathode tube from an exterior thereof to an interior thereof, and a cathode conductor wrapped around and supported on an exterior surface of the cathode tube along an entire length of the cathode conductor within the first bore-hole;
placing an anode into the second bore-hole, the anode including a hollow anode tube perforated along its length to allow liquid water to pass through the anode tube from an exterior thereof to an interior thereof, and an anode conductor wrapped around and supported on an exterior surface of the anode tube along an entire length of the anode conductor within the second bore-hole;
backfilling the first bore-hole and the second bore-hole with granular, electrically conductive material surrounding the exterior surface of the cathode tube and surrounding the exterior surface of the anode tube, respectively;
providing direct current electricity having a negative polarity connected to the cathode conductor and a positive polarity connected to the anode conductor, the electricity having sufficient power to attract sodium ions in the soil to the at least one cathode and chloride ions in the soil to the at least one anode, whereby water in the interior of the cathode tube becomes rich in the sodium ions, and water in the interior of the anode tube becomes rich in the chloride ions;
conveying make-up water through a make-up water line to the interior of the anode tube; and
conveying water with a high concentration of chloride ions from the interior of the anode tube through a first discharge line communicating with the interior of the anode tube, and conveying water with a high concentration of sodium ions from the interior of the cathode tube through a second discharge line communicating with the interior of the cathode tube.

25. The method of claim 24, further comprising backfilling the cathode tube and the anode tube with a granular, conductive material.

26. A system for electrokinetic desalinization of soil, the system comprising:
a first bore-hole formed below the surface of the soil;
a second bore-hole formed below the surface of the soil;
at least one cathode having a hollow cathode tube perforated along its length to allow liquid water to pass through the cathode tube from an exterior thereof to an interior thereof, the cathode tube located within the first bore-hole, and a cathode conductor wrapped around and supported on an exterior surface of the cathode tube along an entire length of the cathode conductor within the first bore hole;

at least one anode having a hollow anode tube perforated along its length to allow liquid water to pass through the anode tube from an exterior thereof to an interior thereof, the anode tube located within the second bore-hole, and an anode conductor wrapped around and supported on an exterior surface of the anode tube along an entire length of the anode conductor within the second bore hole;

the first bore-hole and the second bore hole each including granular, electrically conductive material, the granular, electrically conductive material backfilling the first bore-hole and surrounding the exterior surface of the cathode tube, and backfilling the second bore-hole and surrounding the exterior surface of the anode tube;

a make-up water line communicating with the interior of the anode tube to supply make-up water to the interior of the anode tube;

a first discharge line communicating with the interior of the anode tube; and a second discharge line communicating with the interior of the cathode tube.

* * * * *